(12) United States Patent
Rix et al.

(10) Patent No.: US 7,157,651 B2
(45) Date of Patent: Jan. 2, 2007

(54) INDEPENDENTLY POSITIONABLE AND PROGRAMMABLE KEY SWITCHES

(75) Inventors: Scott M. Rix, Mountain View, CA (US); Michael S. Roberts, San Francisco, CA (US); Preston D. Brown, San Francisco, CA (US); Scott W. Summit, San Francisco, CA (US); Larry J. Kelly, Los Altos, CA (US); Tim L. Canepa, Los Gatos, CA (US)

(73) Assignee: Ergodex, Inc., Mountain View, CA (US)

( * ) Notice: Subject to any disclaimer, the term of this patent is extended or adjusted under 35 U.S.C. 154(b) by 157 days.

(21) Appl. No.: 10/804,575

(22) Filed: Mar. 19, 2004

(65) Prior Publication Data

US 2005/0000787 A1    Jan. 6, 2005

Related U.S. Application Data

(63) Continuation-in-part of application No. 10/246,762, filed on Sep. 19, 2002, now Pat. No. 6,903,662.

(51) Int. Cl.
*H01H 13/00*    (2006.01)
(52) U.S. Cl. .................... 200/5 A; 200/341; 341/22
(58) Field of Classification Search ............... 200/5 A, 200/341–345, 517, 520; 340/10.6, 572.5, 340/870.28; 341/22–28; 345/168–172; 361/680–686; 379/368; 400/490–496
See application file for complete search history.

(56) References Cited

U.S. PATENT DOCUMENTS

| | | | |
|---|---|---|---|
| 3,623,016 A | 11/1971 | Winkler | |
| 3,707,611 A * | 12/1972 | Twyford | .................... 200/211 |
| 4,602,138 A | 7/1986 | Berutto et al. | |
| 4,779,079 A | 10/1988 | Hauck | |
| 4,906,117 A | 3/1990 | Birdwell | |
| 5,144,302 A | 9/1992 | Carter et al. | |
| 5,259,626 A | 11/1993 | Ho | |
| 5,359,166 A * | 10/1994 | Elsaesser et al. | ........... 200/5 A |
| 5,396,267 A | 3/1995 | Bouton | |
| 5,410,333 A | 4/1995 | Conway | |
| 5,438,331 A | 8/1995 | Gilligan et al. | |
| 5,539,775 A | 7/1996 | Tuttle et al. | |
| 5,572,226 A | 11/1996 | Tuttle | |
| 5,579,002 A * | 11/1996 | Iggulden et al. | ............... 341/23 |
| 5,621,316 A | 4/1997 | Dames et al. | |
| 5,668,358 A * | 9/1997 | Wolf et al. | .................. 200/5 A |
| 5,734,376 A | 3/1998 | Hsien | |
| 5,743,666 A | 4/1998 | VanZeeland et al. | |
| 5,838,307 A | 11/1998 | Bouton | |
| 5,842,118 A | 11/1998 | Wood, Jr. | |
| 5,854,945 A | 12/1998 | Criscito et al. | |

(Continued)

OTHER PUBLICATIONS

IBM Tech. Disclosure Bulletin, vol. 32, No. 10A, Mar. 1990, pp. 82-84.

(Continued)

*Primary Examiner*—Michael A Friedhofer
(74) *Attorney, Agent, or Firm*—Venable LLP; Eric J. Franklin

(57) ABSTRACT

An independently positionable key switch including a key base having a key cap receiving opening and at least one gripping feature operative to facilitate gripping of the key base. An actuatable key cap is arranged in the key receiving opening of the key base. The key cap is actuatable between an unactuated position and an actuated position.

29 Claims, 10 Drawing Sheets

U.S. PATENT DOCUMENTS

| | | | |
|---|---|---|---|
| 5,869,966 A * | 2/1999 | Gatehouse | 324/322 |
| 5,870,033 A | 2/1999 | Strolo | |
| 5,896,125 A | 4/1999 | Niedzwiecki | |
| 5,920,308 A | 7/1999 | Kim | |
| 5,929,760 A | 7/1999 | Monahan | |
| 5,949,335 A | 9/1999 | Maynard | |
| 5,995,048 A | 11/1999 | Smithgall et al. | |
| 6,069,564 A | 5/2000 | Hatano et al. | |
| 6,097,301 A | 8/2000 | Tuttle | |
| 6,097,347 A | 8/2000 | Duan et al. | |
| 6,133,833 A | 10/2000 | Sidlauskas et al. | |
| 6,166,706 A | 12/2000 | Gallagher, III et al. | |
| 6,172,609 B1 | 1/2001 | Lu et al. | |
| 6,184,841 B1 | 2/2001 | Shober et al. | |
| 6,236,315 B1 | 5/2001 | Helms et al. | |
| 6,278,369 B1 | 8/2001 | Smith et al. | |
| 6,285,295 B1 | 9/2001 | Casden | |
| 6,285,342 B1 | 9/2001 | Brady et al. | |
| 6,331,145 B1 | 12/2001 | Sity et al. | |
| 6,340,116 B1 | 1/2002 | Cecil et al. | |
| 6,351,215 B1 | 2/2002 | Rodgers et al. | |
| 6,381,418 B1 | 4/2002 | Spurr et al. | |
| 6,650,254 B1 * | 11/2003 | Rix | 341/22 |
| 6,759,613 B1 * | 7/2004 | Kurihara | 200/314 |
| 6,919,817 B1 * | 7/2005 | Choi et al. | 340/825.69 |
| 6,965,511 B1 * | 11/2005 | Rudd et al. | 361/680 |

OTHER PUBLICATIONS

Microchip, microID 13.56 MHz RFID, System Design Guide, 2001, entire document.

ISO/IEC Final Committee Draft 15693-1, pp. 2-7; Annexes A, B, C, and D.

Moyer et al., Silicon Graphics, Inc., Dial and Button Box Installation Guide, Document No. 007-9008-060, 30 pages, copyright 1997 and Product Data Sheet.

Product review of Saitek PC Dash, Saitek Industries Limited, review date Nov. 22, 1997.

Extrasensory Computing, PC Magazine, Apr. 20, 1999, p. 30.

* cited by examiner

INDEPENDENTLY POSITIONABLE AND PROGRAMMABLE KEY SWITCHES

CROSS-REFERENCE TO RELATED APPLICATIONS

This application is a continuation-in-part of U.S. patent application Ser. No. 10/246,762, to Rix et al. for "Computer Input Device with Individually Positionable and Programmable Input Members", filed Sep. 19, 2002 now U.S. Pat. No. 6,903,662, the entire contents of the disclosure of which are hereby incorporated by reference.

FIELD OF THE INVENTION

The present invention relates to computer input devices. In particular, the present invention relates to improvements to the design, construction, and assembly of independently positionable and programmable key switches.

BACKGROUND OF THE INVENTION

Recent advances in computer input technology have provided a revolutionary new platform for tactile input mechanisms. Individually positionable and programmable keys can provide significant advantages over a traditional keyboard. The user can specify the specific location and function of each key, instead of merely adjusting to one particular layout offered by a traditional keyboard.

SUMMARY OF THE INVENTION

An independently positionable key switch including a key base having a key cap receiving opening and at least one gripping feature operative to facilitate gripping of the key base. An actuatable key cap is arranged in the key receiving opening of the key base. The key cap is actuatable between an unactuated position and an actuated position.

A method for assembling, programming and testing a key switch. The key switch including a key base having a key cap receiving opening. An actuatable key cap is arranged in the key receiving opening. The key switch also includes an inductive resonant circuit. The method includes placing the key base in functional proximity to a reader, assembling the key cap and the key base and actuating resonant circuit during the assembly step.

An independently positionable key switch including a key base. An actuatable key cap is operatively connected to the key base. The key cap is actuatable between an unactuated position and an actuated position. At least one of an identity indicator and a status indicator is associated at least one of the key cap and the key base.

An independently positionable key switch including a key base. An actuatable key cap is operatively connected to the key base. The key cap is actuatable between an unactuated position and an actuated position. A coil of a resonant radio frequency inductive circuit is incorporated in or on one of the key base and the key cap.

A method for switching a radio frequency inductive circuit. The method includes bringing the circuit into and out of resonance.

BRIEF DESCRIPTION OF THE DRAWINGS

Objects and advantages of the present invention will be more clearly understood from the following specification when considered in conjunction with the accompanying drawings, in which.

DETAILED DESCRIPTION OF THE INVENTION

Figure 1:
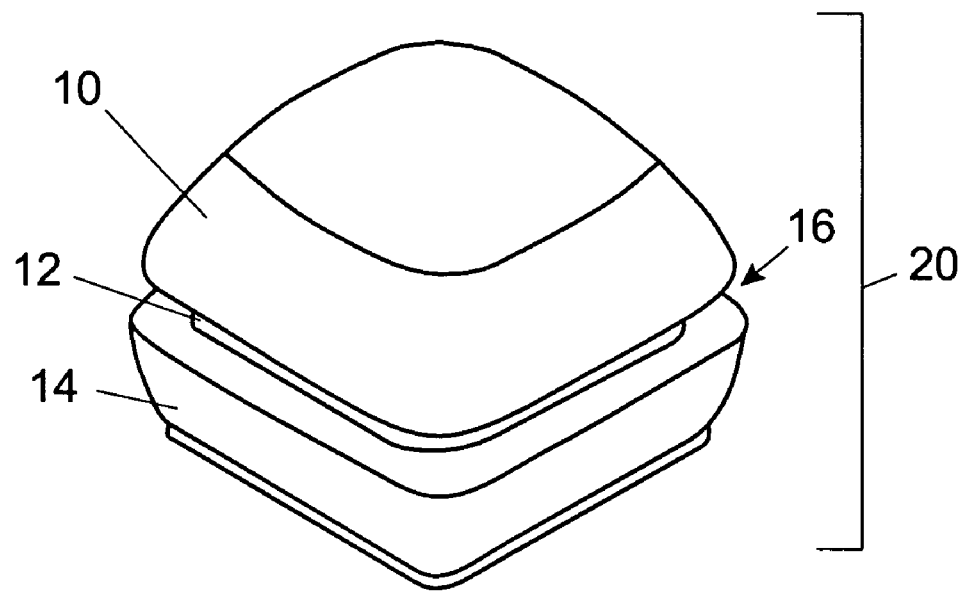
FIG. 1 represents a perspective view of an embodiment of a positionable key from the prior art.

Preferred embodiments of the present invention provide a superior design for individual key switches. The design provides advantages in the design, mechanical construction, and assembly of the positionable keys.

The design of preferred embodiments of the present invention can eliminate a gap or edge between a key cap and its underlying support structure. In a traditional keyboard, such a gap may not be a concern. Nearby keys are arranged so as to prevent the user from easily gaining purchase under a key cap and inadvertently prying it loose. In a single, positionable key, however, a gap between the key cap and its underlying support structure can cause problems. To reposition a key, it is necessary to grasp it. Preferred embodiments of the present invention may provide an identifiable gripping surface and helps to prevent a user from inadvertently grasping the key cap. Grasping the key cap may cause mechanical stress between the cap and base, or even result in the inadvertent removal of the key cap from the key base.

Additionally, preferred embodiments of the present invention may include features in the key base geometry that assist in their designed use. For example, moving and repositioning a positionable key is best done by grasping the key by its base. For grasping purposes, preferred embodiments of the present invention provide key base side walls that may be high enough to provide adequate purchase by the user. However, when using a key, it is desirable to have lower key base side walls, to prevent interference with the user's finger when pressing the key cap. It is also desirable to have the overall height of the key assembly minimized while providing adequate key cap travel. Preferred embodiments of the present invention address design tradeoffs between grasping and pressing positionable keys.

Preferred embodiments of the present invention include a simple construction and assembly of positionable keys, which can eliminate numerous parts and interconnect means, such as solder or electrical connectors, that are cumbersome, time consuming, and cost money. Along these lines, preferred embodiments of the present invention can eliminate complicated mechanical switches, and can combine features of a single key assembly part for multiple purposes.

Preferred embodiments of the present invention may provide a mechanically stable interconnect between a key base and a key cap, while simultaneously optimizing the electrical characteristics of the identification and communications electronics within the positionable key. For positionable keys that rely on radio frequency induction for communication, the embedded electronic circuit typically should be designed for optimum magnetic flux capture within the space available. The mechanical design of a positionable switch typically should provide a robust structural support while also complementing the electrical requirements of the embedded radio frequency circuit.

Furthermore, embodiments of the present invention may include identification to label the identity and/or function of positionable keys. For a traditional keyboard, the function of a key, and its corresponding label identifying the key, are usually the same. For example, a key that produces the letter "Q" (its function) is typically labeled with the character "Q" printed on the top surface of the key cap (its label). For traditional keyboards, having identical functions and labels does not pose a problem, because the function and positions (and therefore, identity) of the keys are fixed. For positionable and programmable keys, however, it may be necessary to specify a key identity independently from key function. Because the location of a positionable key is not fixed, a user must be able to differentiate each key from any other key, and also identify its function quickly and easily.

Embodiments of the present invention may also include means of switching a resosnant circuit in ways that do not require mechanical contact between the switching means and the resonant circuit.

Preferred embodiments of the present invention provide important improvements to the design, construction, and/or assembly of positionable keys. These improvements can include an integrated design of a key cap and key base, where the key base provides a means to capture the key cap in a manner that inhibits inadvertent grasping of the cap, improves the ruggedness and reliability of the key, and reduces the mechanical stress that results from inadvertently grasping the key cap.

Additionally, preferred embodiments of the present invention can include one or more of various gripping features. One example of a gripping feature includes side scoops on the key base structure. The side scoops can provide a visual indicator of the preferred location for grasping the positionable key. The side scoops also provide a more comfortable and natural surface for grasping the positionable key. The gripping features may also or alternatively include one or more surface contour and/or surface texture features.

Preferred embodiments of the present invention may also include a surface area on the key base that is large, so as to help ensure that a user gripping the key to move it will have sufficient purchase to accomplish the move without needing to also grasp the key cap. Along these lines, opposing portions of the side of the key base may be taller than the other side portions. The large side wall portions may provide an increased area for grasping, provide a location for side scoops, and/or provide more material for easier grasping, while not interfering with the normal key operation. Furthermore, preferred embodiments of the present invention may also include regions of the side wall that are lower than the other portions. The lower portions can permit a key cap to be operated without the key base interfering with the finger of the user.

Embodiments of the present invention may also include a mechanical key assembly that is easy to assemble, but difficult to disassemble during typical use. The disclosed design provides for a less-complicated, snap-together assembly of the major components required for the positionable key.

Preferred embodiments of the present invention may also include a method to assemble, test, and, if necessary, program the positionable key in a single step. Methods according to the present invention can lower manufacturing cost and are less complex than designs and methods according to the prior art.

Embodiments of the present invention may also provide a switching means that includes a moldable pill actuator. The pill type actuator may provide a lower cost switching means than a mechanical switch component, while maintaining a switch resistance low enough to successfully operate a high-Q type inductive resonant circuit.

Preferred embodiments of the present invention also include an integrated component that includes a single piece key dome, a mechanical return, a switch actuator, and a cover to protect an underlying integrated circuit. The dome may be molded. This single piece dome may provide multiple integrated functions, improved key reliability, and lower manufacturing costs.

As described herein, embodiments of the present invention may also provide a positionable key design with a central column support in conjunction with side catches that may provide superior mechanical support and optimized flux capture in radio frequency inductively coupled systems.

Additionally, the present invention may also include a novel means of specifying the identity of a positionable key independently from its function. Furthermore, the present invention may include a means of labeling the function of a positionable key dynamically.

A typical prior art design of a positionable key 20 is shown in FIG. 1. In this prior art "clamshell" design, a key cap 10 is mounted on a switching means, or switch 12 that is secured to a key base 14. The switch 12 provides two functions, an electrical contact to close an electrical circuit when in a pressed state, and a spring function to provide a mechanical restorative force to return the key cap 10 to an unpressed state. The positionable key 20 of the prior art includes a gap 16 between the key cap 10 and the key base 14. The gap 16 allows the key cap to move in response to being pressed. Our testing has found that the design of the positionable key 20 allows for improvement. In particular, positionable keys 20 are typically intended to be grasped and repositioned by a user. The normal action of grasping the positionable key 20, however, often leads to inadvertently grasping the key cap 10 instead of the more mechanically robust key base 14. Furthermore, the gap 16 allows a user to gain purchase underneath the key cap 10, frequently resulting in increased mechanical stress upon, or even removal of, the key cap 10.

Figure 2:
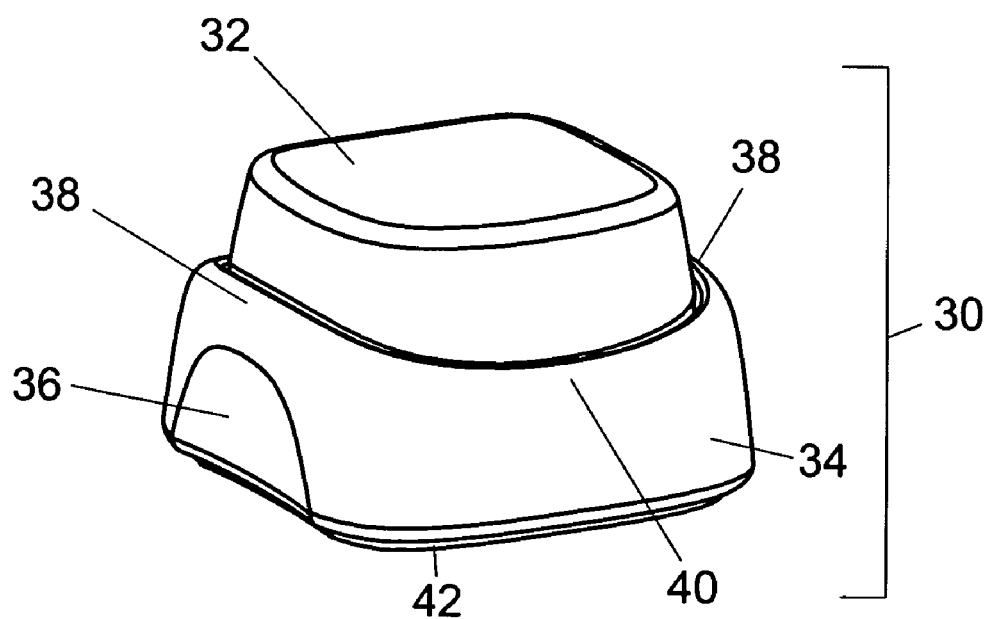
FIG. 2 represents a perspective view of an embodiment of a positionable key in an unpressed state.
Figure 5:
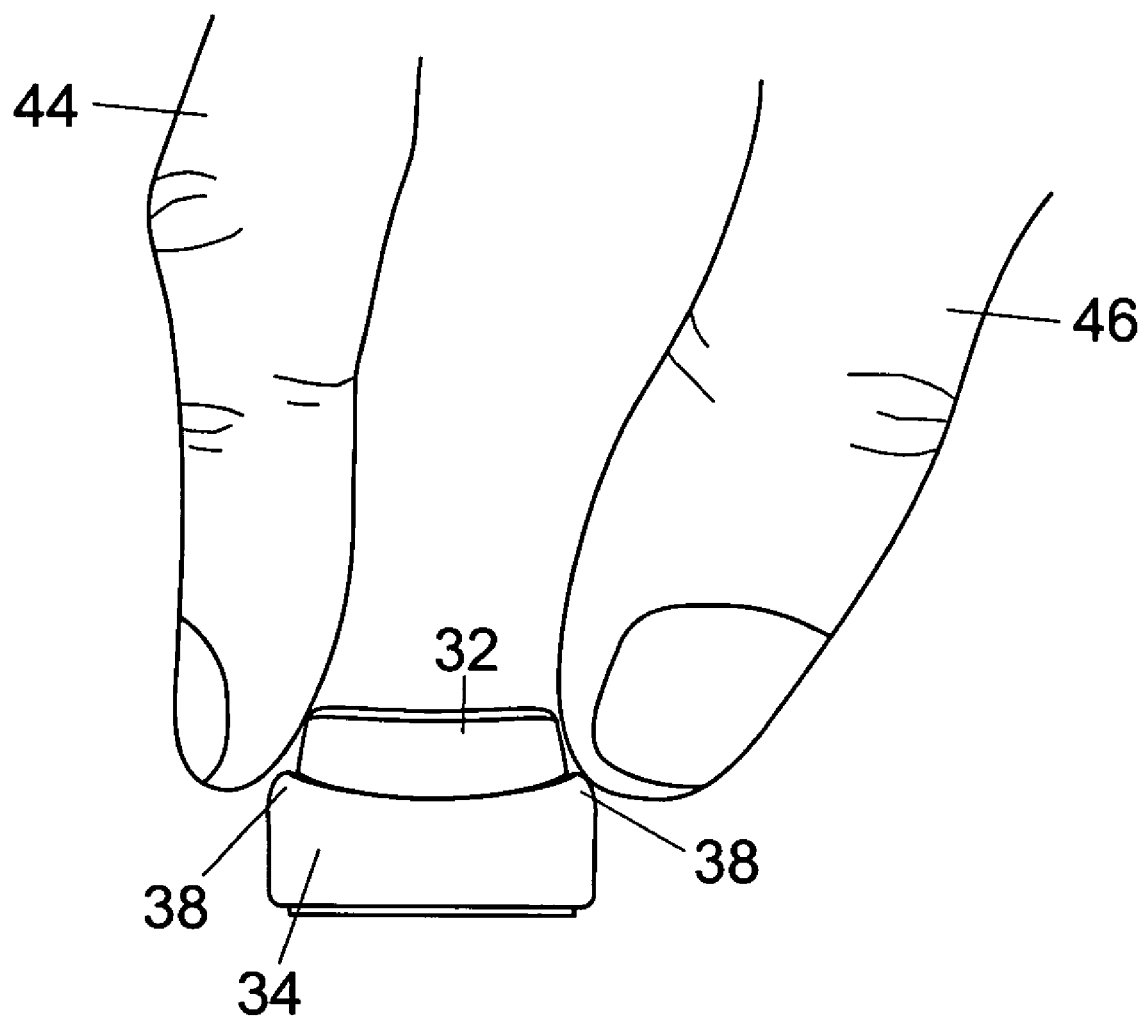
FIG. 5 represents a view of an attempt to grasp the key cap of the embodiment of a positionable key shown in FIGS. 2–4.

An embodiment of the present invention that improves upon the prior art designs is shown in FIG. 2. A positionable key 30 contains a key cap 32 that is captured securely by a key base 34. In this embodiment, the entire lower edge of the key cap 32 is shrouded by the key base 34, inhibiting the ability of a user, under normal use, to pry the key cap 32 loose. Furthermore, as shown in FIG. 5, this shrouded design can limit the ability to grasp the key cap 32 from the sides. When a user attempts to grasp the key cap 32 between a finger 44 and thumb 46, the geometry of the positionable key 30 prevents a secure purchase on the key cap 32. Grasping or pulling on the key cap 32 typically results in the finger 44 and thumb 46 slipping from the key cap 32. The exposed portion of the key cap typically is insufficiently high to permit a user to gain enough purchase on the key cap to remove the key from a surface to which it is adhered. Similarly, the key base typically has a height sufficient to permit a user to grip the key base only and remove the key from a surface to which it is adhered.

Referring back to FIG. 2, a preferred means of attaching the positionable key to a desired surface is with an adhesive 42. In preferred embodiments, the adhesive is a soft polyurethane composition that provides a non-permanent, mechanical, surface adhesion. Of course, many other attachment means may also be suitable, including, but not limited to: magnets, suction cups, hook and loop fasteners, and other attachment means known in the art. In preferred embodiments, the adhesive 42 is affixed with permanent glue to the bottom of the key base 34. Typical properties of the adhesive 42 produce a temporary bond to a surface that is strong in tension, but weak in shear. Using a proper formulation of the adhesive 42, preferred embodiments will demonstrate secure adhesion to a surface while pressing the positional key 30, yet will yield easily with a slight rotational twist of the key base 34.

To facilitate the grasping and/or twisting motion needed to remove the positionable key 30, the key base may include one or more gripping elements. The gripping elements are operative to facilitate gripping of the key. The gripping elements may include surface contours, surface textures and/or other features that permit the key to be gripped and removed. The gripping elements may be located on any portion or portions of the surface of the key base. The gripping elements may be continuous or discontinuous and may be employed alone or in combination.

The gripping elements in the embodiment shown in FIG. 2 include side scoops 36 provided on opposite sides of the key base 34. The side scoop 36 shown in FIG. 2 is matched by an identical scoop, hidden in the perspective view shown in FIG. 2, on the opposite side of the key base 34. While the embodiment shown in FIG. 2 includes two side scoops, other embodiments may include one or more than two. One side scoop could still facilitate the gripping and removal of a key, while more than two side scoops could permit a user to grip the key in a variety of positions. Keys having similar or different shapes than the shape shown in FIG. 2 could include side scoops or other gripping elements that are not on opposite sides of the key base. Also, as discussed above, one or more gripping elements may be included on only one side of a key. One example of a key having another shape could be an arrow shaped key. Such a key could include gripping element(s) on only one side or on two sides that are not exactly opposite, but at an angle to each other. In the end, one or more gripping elements alone or in combination may be utilized on any portion or portions of the surface of a key to facilitate the gripping of the key.

A gripping element that includes a side scoop, such as side scoop 36 shown in FIG. 2, may provide a gripping surface on the key base 34 to be grasped more easily. A side scoop or other gripping element(s) may also provide a visual indication of one or more preferred areas to grasp. Gripping in preferred areas may assist a user in repositioning the positionable key 30. The side scoops 36 may be textured to provide better surface friction. The side scoops 36 may be convex or concave, and may employ other gripping features, such as ridges, ribs, bumps, and/or any other surface feature, contour, texture to facilitate gripping the key base. Such ridges, ribs, bumps, and/or any other surface feature, contour, texture could also be used alone without the side scoop(s). This means that a key base could include one or more gripping elements alone or in combination.

To facilitate gripping of the key base by a user, the height of at least one portion of one or more of the side walls of the key base may be greater than other portions of the side walls of the key base. In embodiments that include one or more side scoops, the side scoop(s) may not extend all the way to the top of the key base, where a key cap receiving opening is arranged. Such an embodiment is shown in FIG. 2. The embodiment shown in FIG. 2 includes opposing extended or raised areas 38 on the walls of the key base 34 to assist grasping. The areas 38 provide additional material in the key base 34 for the fingers to gain purchase.

In the embodiment shown in FIG. 2, rather than including a space or raised area 38 between the top of the side scoop and the top of the key base, the side scoop could extend all the way to the top of the key base while the side of the key base shown in FIG. 2 with the side scoop would have the same height. Alternatively, the side of the key base shown in FIG. 2 with the side scoop could have the same height as shown in FIG. 2, but the side scoop omitted. Whether or not the side scoops are included, one or more other gripping elements could also be included.

Figure 4:
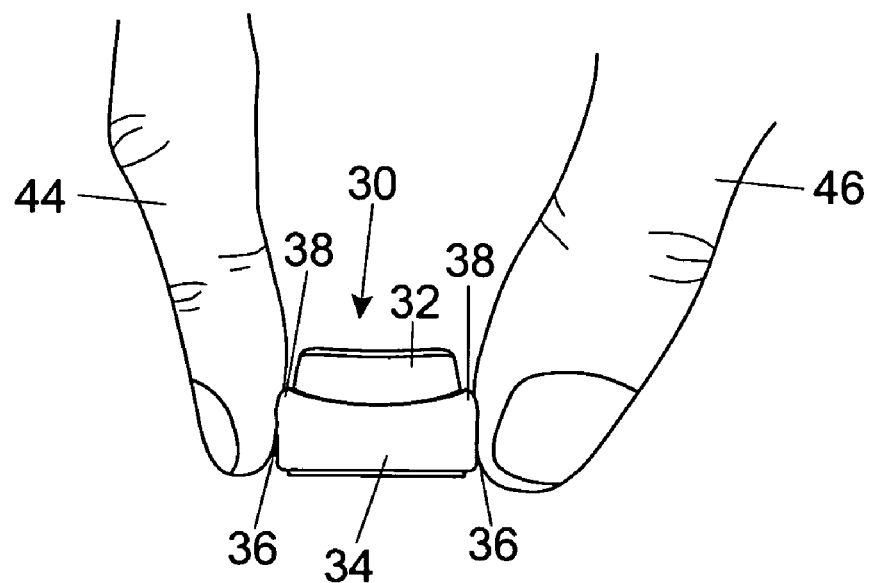
FIG. 4 represents a view of grasping the key base of the embodiment of a positionable key shown in FIGS. 2 and 3.

FIG. 4 illustrates advantages that may be provided by the side scoops 36 and the extended height areas 38. When grasping the key base 34 between the finger 44 and the thumb 46, the side scoops 36 and the extended height areas 38 help to provide a secure location where a user can comfortably gain purchase on the key base 34 without inadvertently grasping the key cap 32.

To facilitate operation of the key cap by a user, the height of at least one portion of one or more of the side walls of the key base may be lower than other portions of the side walls of the key base. The region having a lower side wall height is lower in the sense that it is lower or closer to the bottom edge of the key base than other sides or side portions of the key base. According to some embodiments, the lowered area or areas is or are at a level that is at or slightly below the level of the key cap when depressed. Typically, the lowered area could be as low as desired but typically not so low that the bottom edge of the key cap is exposed or that a gap is created between the lower edge of the key cap and the upper edge of the key base. However, in some embodiments, a gap could exist.

Figure 3:
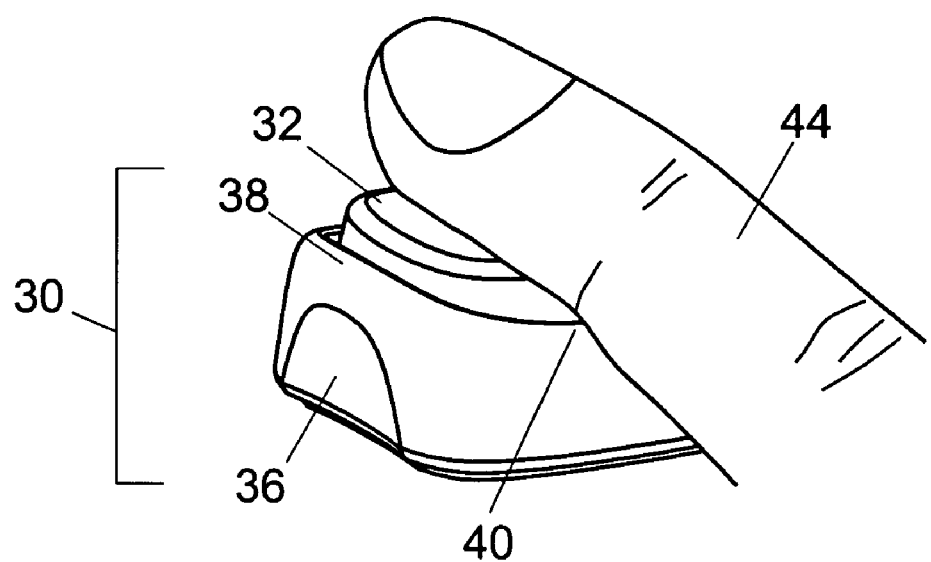
FIG. 3 represents a perspective view of the embodiment of a positionable key, shown in FIG. 2, in a pressed state.

The embodiment of the key base shown in FIG. 2 includes a lowered wall portion, or lowered area 40 having reduced height. When the positionable key 30 is in the pressed state, the lowered area prevents a finger from contacting the key base 34. As shown in FIG. 3, positionable keys are generally pressed from a preferred direction. The lowered area 40 prevents the finger 44 from contacting the key base 34 under normal use. The lowered area 40 allows the key cap 32 to be operated through its full range of motion in a manner that adds comfort by eliminating or at least minimizing contact between the key base 34 and the finger 44. In preferred embodiments, an identical lowered area 40 is provided on the opposite side of the key base 34. This identical lowered area (not shown) allows the positionable keys to be used comfortably from either opposing side.

Figure 6:
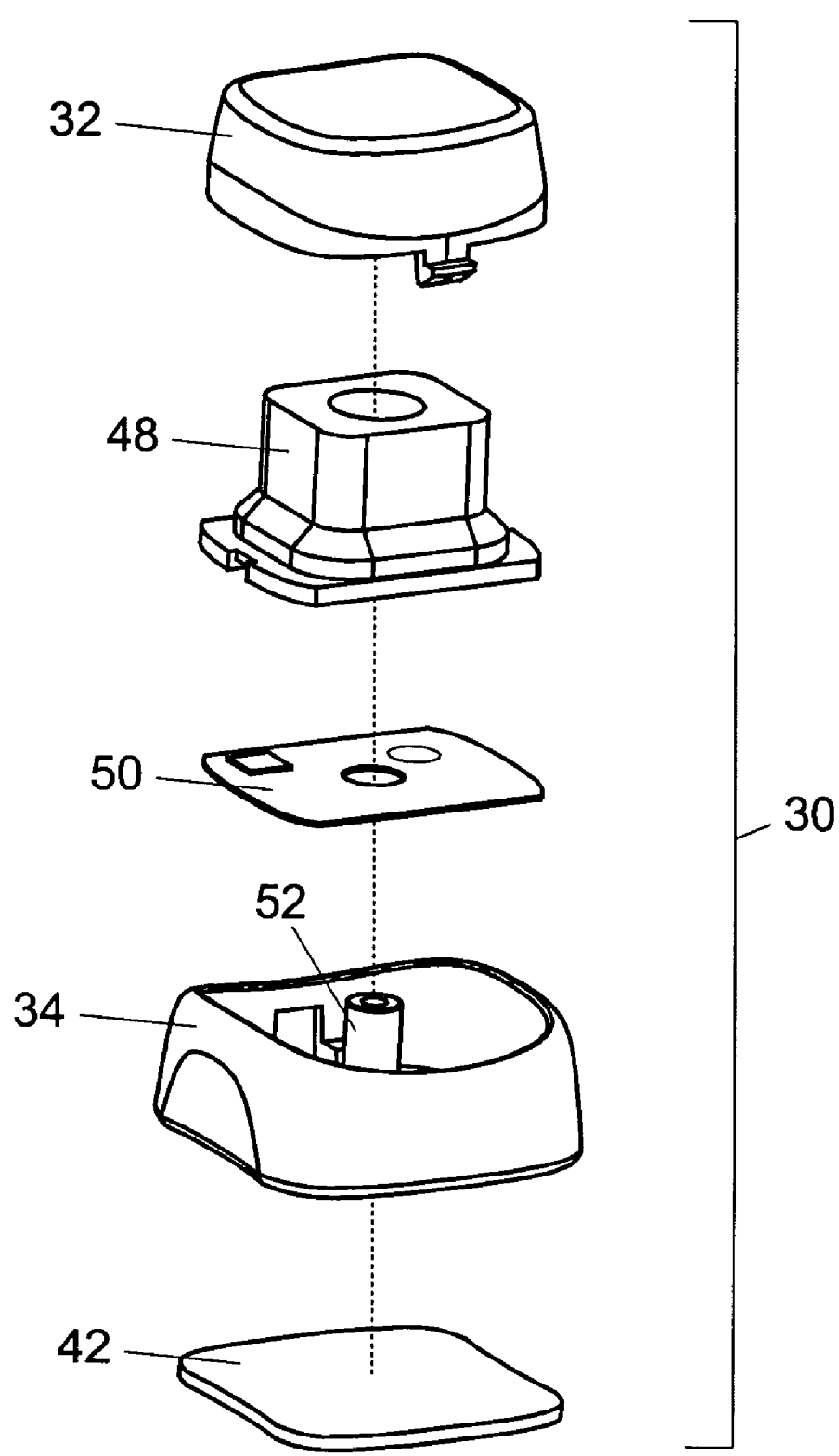
FIG. 6 represents an exploded view of an embodiment of a positionable key.
Figure 7:
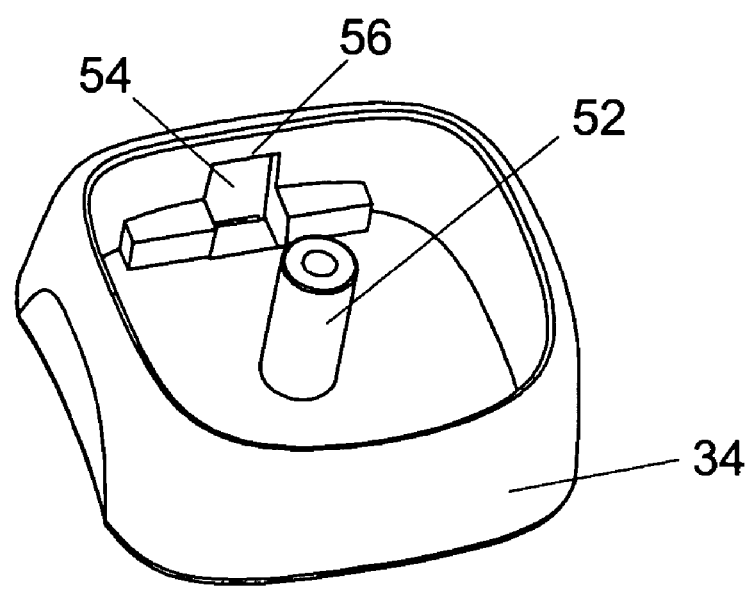
FIG. 7 represents a perspective view of the inside of the embodiment of a key base shown in FIG. 6.

FIG. 6 illustrates component assembly of an embodiment of a key switch according to the present invention. The components of the positional key 30 assembly include: the key cap 32, a flexible dome, or dome 48, a printed circuit board, or PCB 50, the key base 34, and the adhesive 42. The present invention may include elements to guide the actuation of the key cap and to secure the key cap to the key base. The elements to accomplish these functions may be separate or partially or entirely combined. In the embodiment shown in FIG. 6, the primary mechanical support of the positional key 30 is provided by a vertical central post, or post 52 in the center of the key base 34. The post 52, shown in FIG. 7, provides a structural column to align and support the PCB 50, the dome 48, and the key cap 32. The key cap 32 slides over the post 52 through a fitted collar, or collar 58, shown in FIG. 8. The mechanical fit between the collar 58 and the post 52 constrains the key cap to move perpendicular to the key base. Although this embodiment includes a circular post 52 and collar 58, any other suitable geometry may be used. For example, the collar could be square, triangular, or oval or have any other shape. Alternately, the collar 58 may be located on the base 34, and the post 52 may be located on the cap 32, without altering the important associated functions. Also, a key switch according to the present invention could include more than one post and collar.

To secure the key cap and the key base together, the present invention may include one or more tabs on the key base and/or key cap. The tabs could be located on any portion of the key cap and/or key base, including the post or collar. Each tab may engage a tab recess and stop on the other of the key base and key cap as described below.

Figure 8:
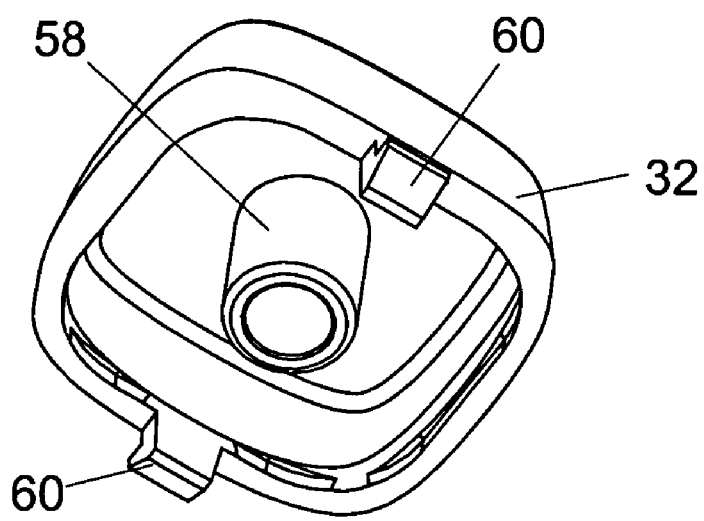
FIG. 8 represents a perspective view of the underside of the embodiment of a key cap shown in FIG. 6.
Figure 9:
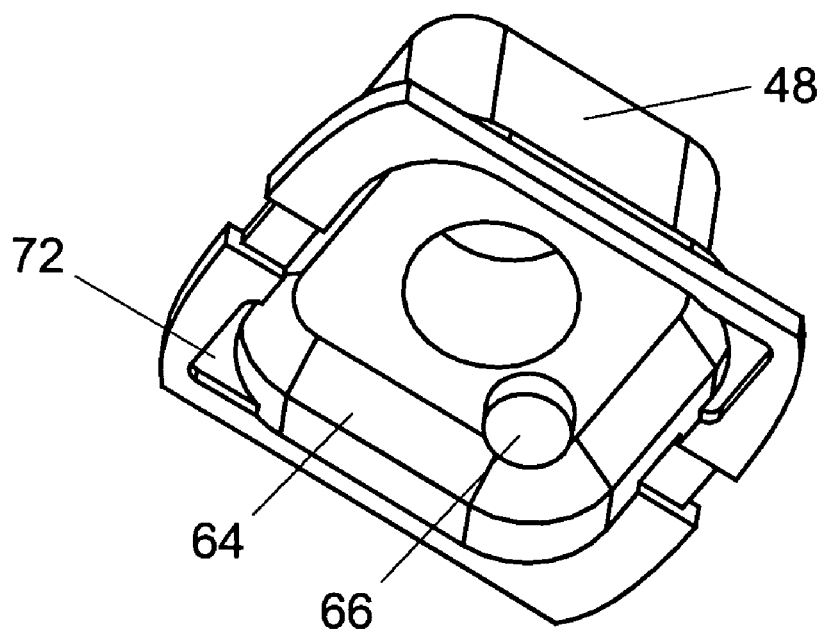
FIG. 9 represents a perspective view of the underside of the embodiment of a dome shown in FIG. 6.

The embodiment shown in FIG. 8 includes a pair of opposing tabs 60 on the key cap 32. Tabs 60 travel in a corresponding pair of tab recesses 54 in the key base 34 shown in FIG. 7. A pair of opposing tab stops 56 on the key base 34, shown in FIG. 7, captures the key cap 32 by blocking the travel of the tabs 60. The combined mechanical interaction of the post 52, the collar 58, the tabs 60, the tab recesses 54, and the tab stops 56 produces a robust and secure motion of the key cap 32 in relation to the key base 34. As shown in the cross sectional drawings of the positional key 30 in FIG. 14 and FIG. 15, the post 52 and the collar 58 combine to constrain the key cap 32 to move perpendicular to the key base 34. The tabs 60 travel in the tab recesses 54, and constrain the key cap 32 from rotating during operation. The angled design of the tabs 60 allow the key cap 32 to be snapped easily into the key base 34 during assembly. Once assembled, the tabs 60 catch on the tab stop 56, preventing the key cap 32 from being removed easily from the key base 34. FIG. 8 shows just one arrangement of tabs, tab stops and tab recesses. As noted above, the number and location of the tabs, tab stops and tab recesses may vary so as to reliably connect the key base and key cap. This may particularly be true for keys having different shapes than the key shown in the figures.

Figure 14:
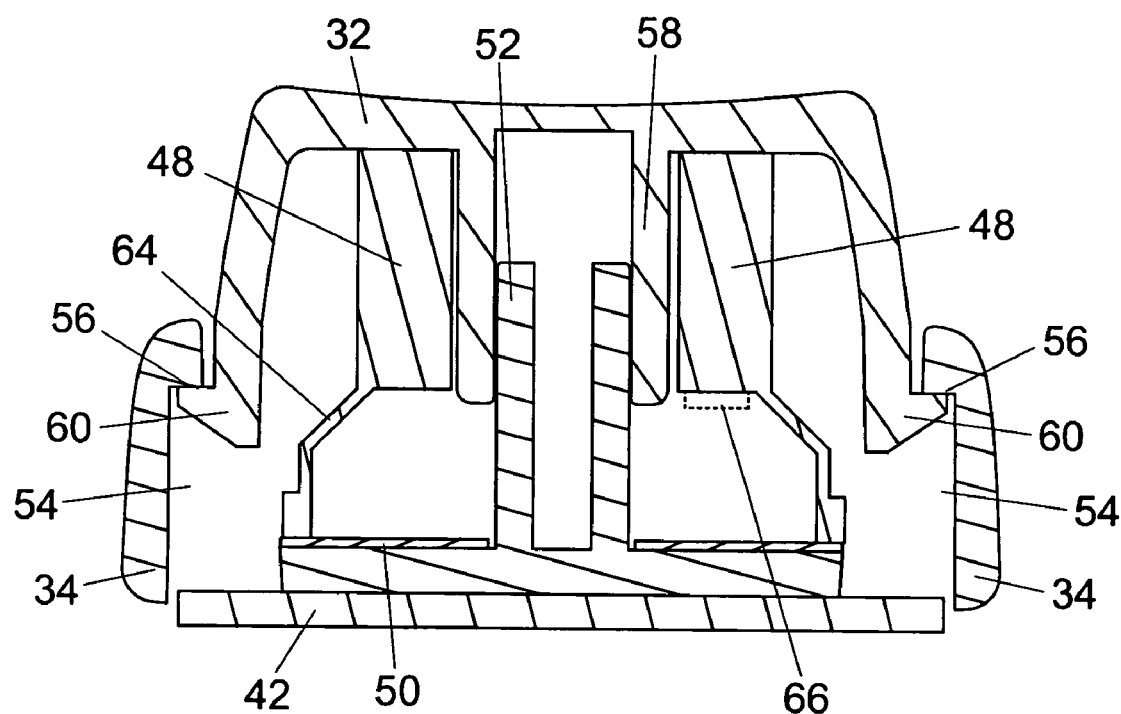
FIG. 14 represents a cross sectional view of an embodiment of a positionable key in an unpressed or unactuated state.
Figure 15:
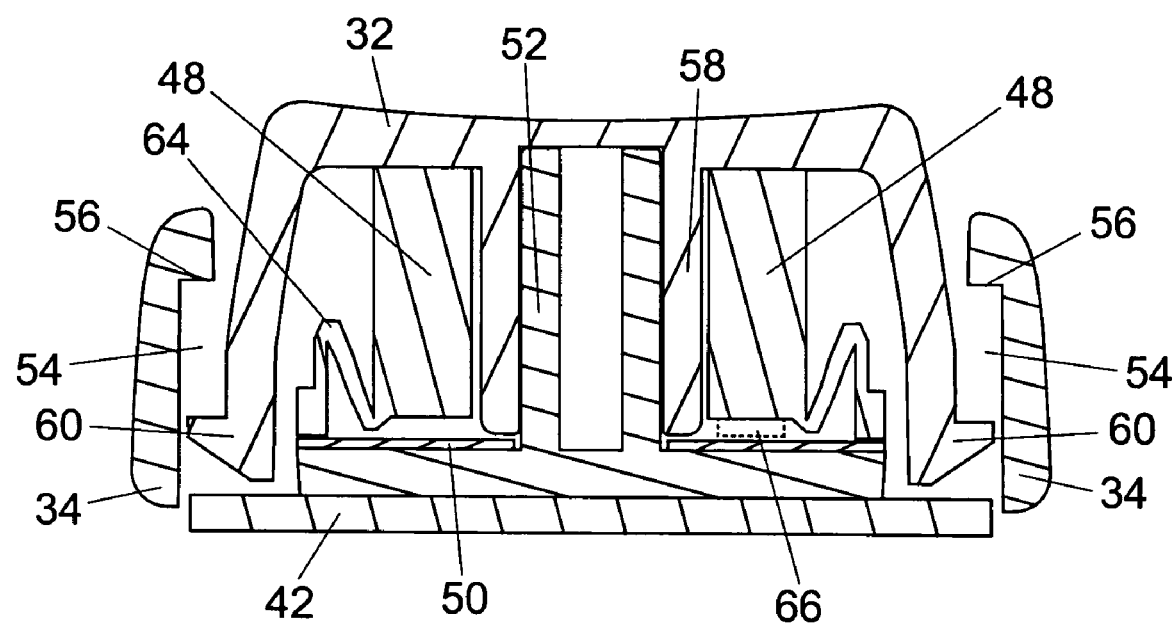
FIG. 15 represents a cross sectional view of the embodiment of a positionable key, shown in FIG. 14, in a pressed or actuated state.

In preferred embodiments of the present invention, the mechanical switch 12 of the prior art may be replaced with a flexible molded dome, or key dome 48. In preferred embodiments, the dome 48 may be molded from a flexible silicone rubber composition. The key dome 48 may provide a simple structure that may perform the same spring function of the mechanical switch 12. The restorative mechanical force that returns the key cap 32 to its unpressed, unactuated state is supplied by a flexible web, or web 64. The web 64 is designed is to provide a desirable force-deflection response of the key cap 32. As shown in FIG. 14 and FIG. 15, the web 64 deforms when the key cap 32 is depressed during actuation. When the key cap 32 is released, the web 64 returns to its uncompressed state, pushing the key cap 32 back to its unpressed location.

A key switch according to the present invention may also include electrical switching elements. According to one embodiment, the electrical switching capability of the key dome 48 may provided by an electrically conductive pill, or pill 66. When the positionable key 30 is pressed, the pill 66 connects the interleaved fingers of a switch 70 located on the PCB 50, shown in FIG. 10. For positionable keys 30 that rely on radio frequency induction circuitry to communicate, the preferred composition of the pill 66 includes silver nodules impregnated in a silicone rubber. This material, referred to as a silver dust pill, is available from ITT Industries, headquartered in White Plains, N.Y. The silver matrix composition may provide optimal price and performance characteristics. According to their manufacturer, the silver dust pills typically provide a contact resistance of less than 1 Ohm. Common conductive carbonized rubber pills may also be used. However, the conductive carbonized rubber pills produce an undesirably high resistance path for high-Q inductive circuits. Alternately, a solid metallic disk type pill may also be used. Metallic disk type pills provide a very low resistance contact path. However, our experience has shown that the metallic disks are more expensive and are more mechanically abrasive to the switch 70 than silver matrix pill composition of preferred embodiments.

Figure 10:
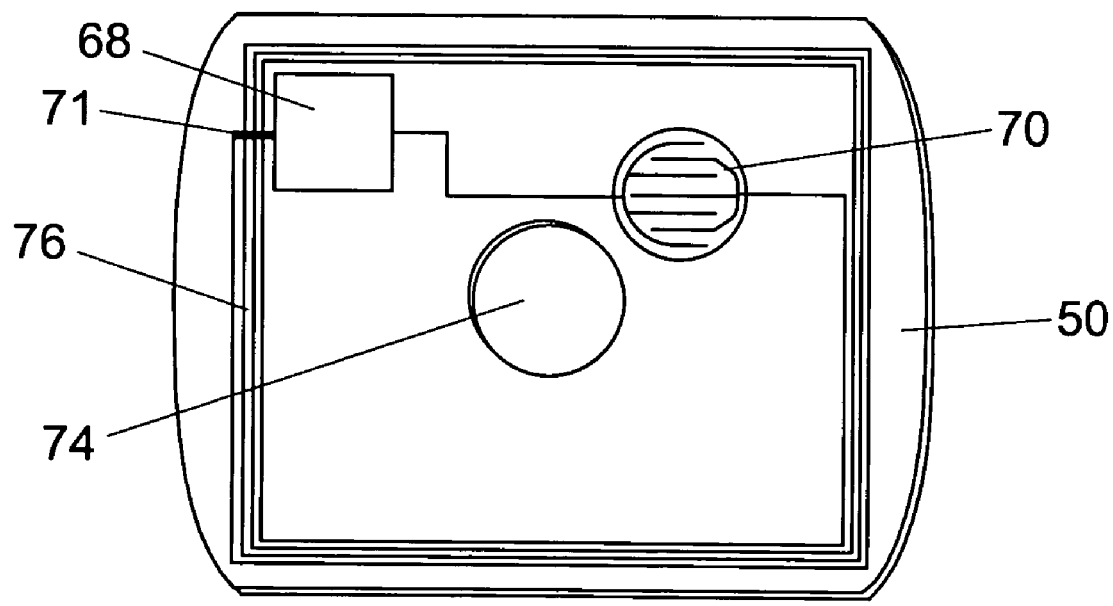
FIG. 10 represents a top view of the embodiment of a printed circuit board shown in FIG. 6.
Figure 11:
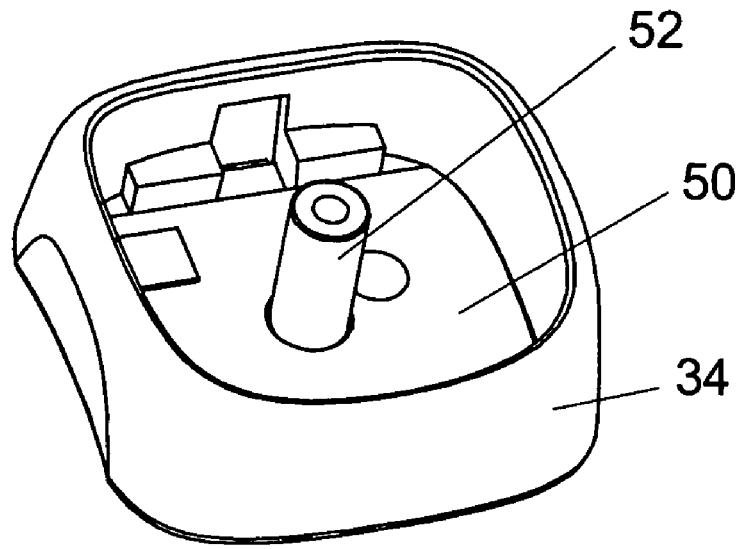
FIG. 11 represents a perspective view of the embodiments of the key base and printed circuit board shown in FIGS. 6, 7, and 10 in an assembled state.

Along with the switching and mechanical spring functions described above, the key dome 48 may also protect an integrated circuit, or IC 68 located on the PCB 50 as shown in FIGS. 6, 10, and 11. The IC 68 may typically be an RFID integrated circuit. The IC 68 may be a bare die mounted on the PCB 50. The key dome 48, shown in FIG. 8, may include an IC well 72 that covers and protects the IC 68. The IC well 72 may provide a barrier that keeps out moisture and foreign particles that the positionable key may be exposed, such as, for example, from an accidental liquid spill. The IC well 72 may protect the IC 68 from potential damage from these foreign materials.

The integrated structure of the key dome 48 may provide a single piece construction with mechanical, electrical, and protective properties. The key dome 48 may also provide a simplified assembly when compared to the switch 12 of the prior art. The key dome 48 merely needs to be dropped into position above the PCB 50 during construction of the positionable key 30.

As in the embodiment shown in FIG. 10, the electrical design of the PCB 50 may complement the mechanical structure of the positionable key 30. As is well known in the art, a resonant radio frequency inductive circuit may be built by connecting a coil 70 to the IC 68 designed for such a purpose. In the embodiment shown in FIG. 10, an electrical bridge, or jumper 71 is used to connect the outside of the coil 70 to the IC 68 without electrically shorting the coil traces. For optimum performance, the coil inductance typically is matched to the circuit capacitance to make the circuit resonant at a specified frequency using the relationship $F \propto 1/\sqrt{(LC)}$. To optimize the circuit performance, it may be desirable to maximize the magnetic flux capture for a given circuit inductance and capacitance. The practical effect of these relationships is that the diameter of the coil 76 typically should be made as large as possible, within the mechanical constraints of the positionable key 30. Locating the post 52 at the center of the positionable key 30 in preferred embodiments may have an advantage of using the area inside the coil to provide a pass-through hole 74. By placing the primary mechanical structure of the key 30 at the center, the diameter of the coil 76 may be maximized within the constraints of the overall design.

Figure 12:
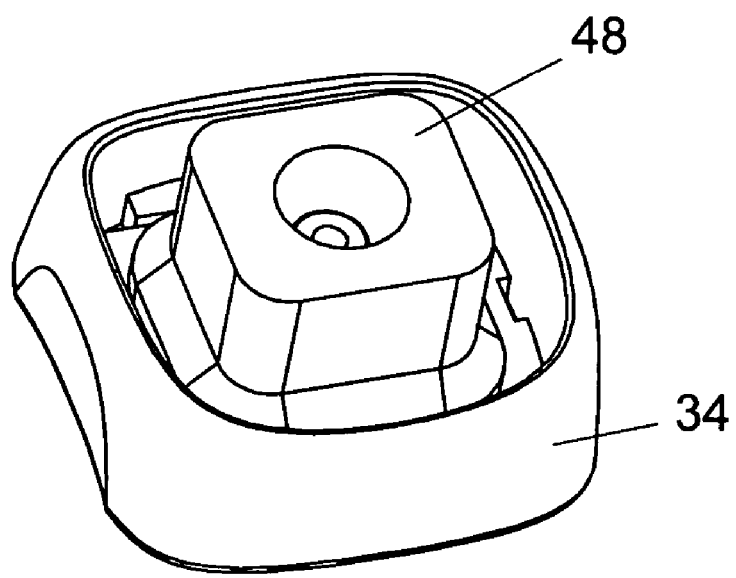
FIG. 12 represents a perspective view of the embodiments the key base, printed circuit board, and dome shown in FIGS. 6, 7, 9, and 10 in an assembled state.
Figure 13:
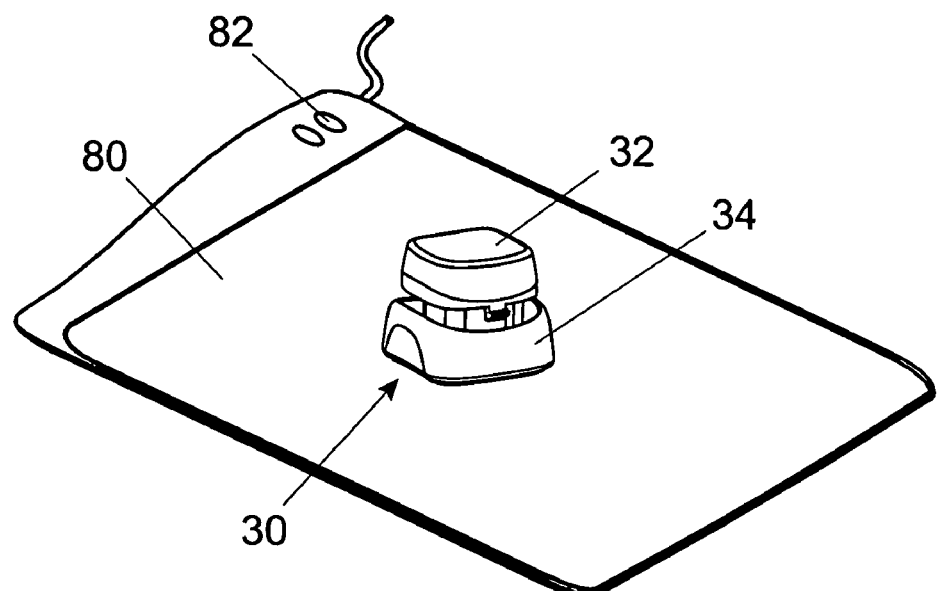
FIG. 13 represents a perspective view of the embodiments of the key base, printed circuit board, dome, and key cap shown in FIGS. 6–10 being assembled in the proximity of a reader.

Preferred embodiments of the present invention may also provide a greatly simplified construction and assembly over the prior art. According to one embodiment, the positional key 30 may be built by stacking the appropriate components and then snapping the key cap 32 into the key base 34. FIG. 11 shows a construction step according to preferred embodiments. In the step shown in FIG. 11, the PCB 50 is placed into the key base 34 over the post 52. Next, as shown in FIG. 12, the dome 48 may be placed over the PCB 50 in the key base 34. To complete the assembly, the key cap 32 may be aligned and snapped into the key base 34, as shown in FIG. 13. This snap together assembly greatly reduces the complexity of manufacturing the positionable key 30.

FIG. 13 also shows another advantage of preferred embodiments of the present invention. Along these lines, if the positionable key 30 is assembled in the proximity of a radio frequency identification reader, or reader 80 described by the prior art, the positionable key 30 may be programmed and tested as it is assembled. As described above, to construct the positionable key 30, it is necessary to snap the key cap 32 into the key base 34. If the key is constructed properly, this should cause the pill 66 to close the switch 70. The reader 80 may scan for pressed keys in its proximity, as described in our prior patent application. The reader may detect the presence of a valid pressed key and signal when a positionable key 30 is detected, for example by illuminating a signal LED 82. In one embodiment of the invention, if the reader signals that it can detect a key, then the positionable key 30 is properly assembled and is electrically functioning. If the reader does not signal, then something is wrong with the positionable key 30 or one of its components. By constructing a positionable key 30 in the vicinity of the reader 80, the electrical function of the key may be verified at the time of manufacture. Furthermore, in preferred embodiments, the IC 68 of the newly created positionable key 30 may be initialized and programmed by communicating with the reader 30 at this time. Information about the key identity and other characteristics such as key color may be loaded into the IC 68 at the time of manufacture and testing. The ability to construct, test, and/or program the positionable key 30 in a single step provides a dramatic improvement to manufacturing efficiency and cost over the prior art.

Preferred embodiments of the present invention may include one or more key identity and/or function indicators. Typically, such identity and function indicators permit a user to visually discern the identity of the positionable key 30. As is well known in the art, typical keyboard key caps are often marked with labels that identify their function. Key caps are usually labeled on their top or side surfaces to display their function to a user.

One problem with positionable keys, however, is that their identity must be displayed along with their function. One method of identifying a positionable key 30 among a group of positionable keys 30 is to label each key with a unique ordinal number. Our research has found, however, that identifying a positionable key 30 by placing a number on the key cap 32 often confuses new users about its meaning. For example, displaying the number "5" on a key cap 32 often represents to an untrained user that the function of a positionable key 30 is to produce an input of a "5" character. This confusion between the key function and key identity seems to occur even if we place the number on the side of the key cap 32.

Figure 16:
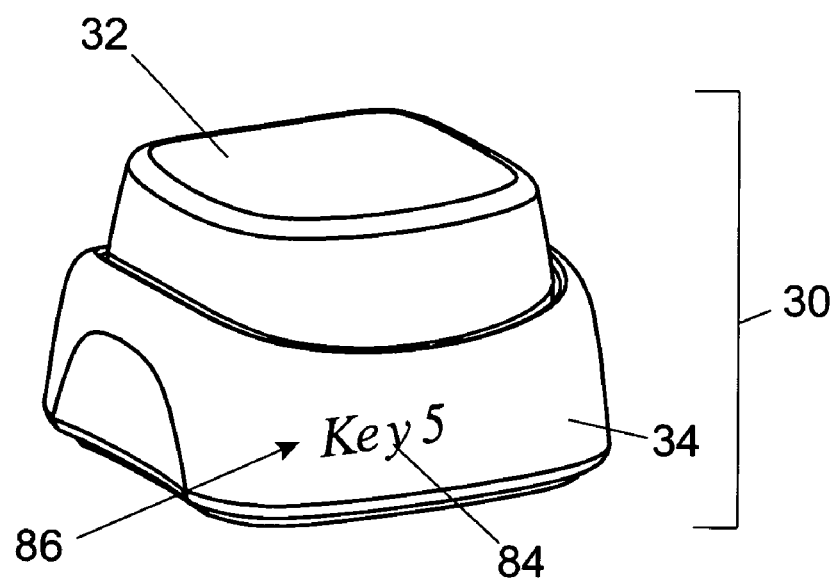
FIG. 16 represents a perspective view of an embodiment of a positionable key including an embodiment of a key identity label on the key base.
Figure 17:
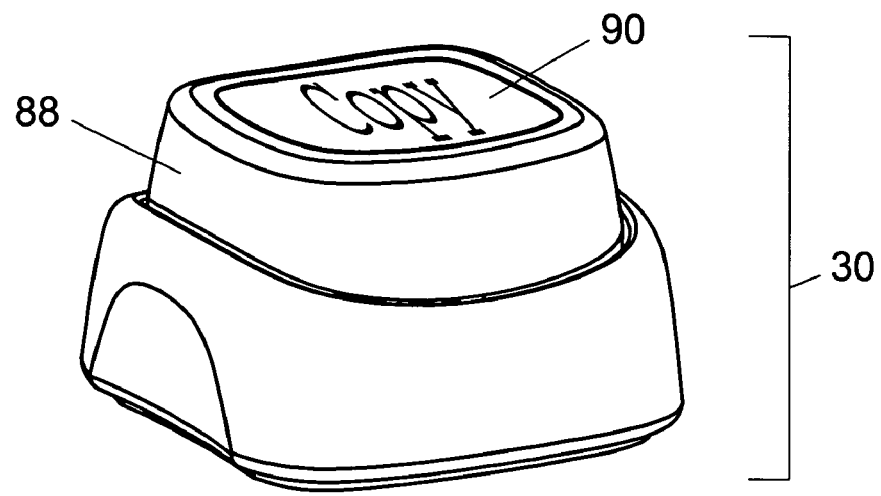
FIG. 17 represents a perspective view of an embodiment of a positionable key including an embodiment of an electronically changeable display means on the key cap.

Embodiments of the present invention can include a solution to the above problem. Along these lines, at least one status and/or identity indicator may be included on one or both of the key cap and key base. For example, the embodiment shown in FIG. 16 includes a visible surface 86 on the key base 34. The identity of the key may be displayed with an identity label 84 on the visible surface 86. The identity label 84 may uniquely identify a positionable key 30 among a group of positionable keys 30 may include one or more letters, numbers, and/or symbols. Placing an identity label 84 on the key base 34 may improve the understanding of the distinction between key identity and key function to untrained users. It may also free the surfaces of the key cap 32 to receive intuitive markings or labels that reveal the key function. Supplying the visible surface 86 and the identity label 84 has resulted in increased comprehension of embodiments of the present invention.

Preferred embodiments of the present invention may also provide a means to dynamically display the function of a positionable key 30. Unlike the key identity, which is typically fixed at the time of manufacture, the function of a positionable key 30 may vary greatly depending on the needs of the user. A user may change the function of a positionable key 30 depending on the current software that the user is working with, for example. A display key cap 88 may be substituted for the key cap 32 in the present invention. The display key cap 88 may include a dynamic display means, or display 90 on one or more of its surfaces.

A function and/or identity display according to the present invention may also include an electronic display. Along these lines, the display 90 may be of any known electronically modifiable type, including a liquid crystal display (LCD), an organic light emitting diode (OLED) display, or one of the various electronic ink type displays known in the art. The display 90 is dynamically changed to reflect the current function of the positionable key 30. According to preferred embodiments, information may be sent to the display through radio frequency inductive communication with the reader 80. However, any other known wireless communication means may be employed. The resonant circuit for the display may be separate from the PCB 50. The display resonant circuit may be mounted underneath the display key cap 88. The display 90 and the associated electronics may be powered by inductive coupling with the reader 80, or by a battery or any other known means. The ability to display the function of a positionable key 30 by wireless communication with the reader 80 represents an important improvement to the prior art.

Figure 18:
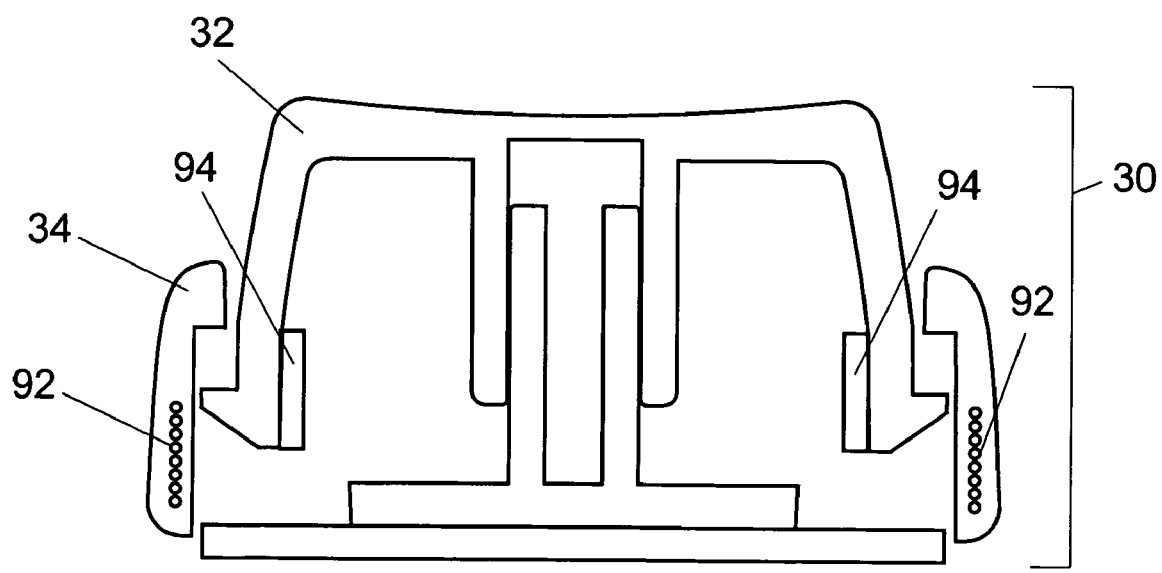
FIG. 18 represents a cross sectional view of an embodiment of a positionable key including an embodiment of an embedded coil and a resonant switch with the key in a partially pressed state.

Preferred embodiments of the present invention may also include alternate arrangements of the coil 50 and the switch 70. For example, FIG. 18 shows a simplified cross sectional view of an embodiment of a key cap 32 and a key base 34. The key dome in FIG. 18 has been omitted for clarity. The embodiment of a positionable key 30 shown in FIG. 18 includes at least two improvements to the prior art. The first improvement includes a wound coil 92 (shown in cross section) embedded within the housing of the key base 34. By incorporating the coil 92 within the housing of the positionable key, the PCB 50 may be reduced in size, or even eliminated, as the IC 68 may be directly connected to the coil element without the need for the underlying structure of the PCB 50. Furthermore, the embedded coil 92 may also provide an improved average internal area over the coil design shown in FIG. 10, resulting in a better flux capture capability for a given key footprint. Of course, the coil 92 may also be applied to the inside wall, or the outside wall of the key base 34 or the key cap 32 to produce a similar benefit.

A second improvement included in the embodiment shown in FIG. 18 includes providing an alternative switching means for the radio frequency resonant circuit in the positionable key 30. Instead of using a mechanical contact-type switch, a resonant switch 94 may be used. In such an embodiment, the resonant switch 94 may be attached to the key cap 32. The resonant switch 92 may be constructed of a ferrite material. However, resonant switches may be created with any material that affects the inductance or capacitance of a nearby circuit. As discussed in the U.S. patent application Ser. No. 10/246,762, to Rix et al. for "Computer Input Device with Individually Positionable and Programmable Input Members", radio frequency inductive resonant circuits are strongly sensitive to changes in inductance and capacitance. Pressing the key cap 32 brings the resonant switch 94 closer to the coil 92, increasing the overall circuit inductance. Releasing the key cap 32 moves the resonant switch 94 further away, decreasing the overall circuit inductance. In preferred embodiments, the radio frequency inductive circuit of the positionable key 30 is design to be "in tune" when the key cap 32 is pressed, and "out of tune" when released. The resonant circuit of the positionable key 30 is designed such that when the key cap 32 is pressed, the circuit is in tune, and the RFID chip may communicate. When the key cap is released, the resonant circuit is out of tune, and therefore does not communicate. This is just one potential means among many possible means to adjust the resonant characteristics of the inductive circuit to provide a switching mechanism upon actuation of the positionable key 30. Another means could include adjusting the distance to conductive surfaces, such as a metal plate, to change the circuit capacitance. Alternately, the coil geometry could be modified upon actuation of the key to change its resonant characteristics. Any means know in the art that changes the resonant characteristics of an inductive circuit may be formulated to provide a switching means.

It is important to note that the two improvements shown in FIG. 18 are merely illustrative of two independent improvements. The embedded coil 92 and the resonant switch 94 may be used together, or they may be applied individually, where appropriate.

We claim:

1. An independently positionable key switch, comprising:
   a key base including a key cap receiving opening and at least one gripping feature operative to facilitate gripping of the key base, wherein at least one portion of a side wall of the key base has a lower height than all other portions of all other side walls of the key base; and
   an actuatable key cap arranged in the key receiving opening of the key base, the key cap being actuatable between an unactuated position and an actuated position.

2. The key switch according to claim 1, wherein the at least one gripping feature comprises at least one of a side scoop, surface texture and surface contour.

3. The key switch according to claim 2, wherein the surface contour comprises at least one of grooves and ridges and the surface texture comprises at least one of bumps and depressions.

4. The key switch according to claim 1, wherein the at least one gripping feature comprises at least one side scoop, wherein the side scoop does not extend to the key cap receiving opening.

5. The key switch according to claim 1, wherein the at least one gripping feature comprises two side scoops arranged on opposite sides of the key base.

6. The key switch according to claim 5, wherein the side scoops do not extend to the key cap receiving opening.

7. The key switch according to claim 5, further comprising:
   a key base extension arranged between the side scoops and the key cap receiving opening.

8. The key switch according to claim 5, wherein the side scoops have a size sufficient to permit gripping of the key base and removal of the key base from a surface without gripping the key cap.

9. The key switch according to claim 5, wherein a distance between the side scoops and the key cap receiving opening is sufficient to prevent gripping of the key cap when the side scoops are gripped to remove the key switch from or place the key switch on a surface.

10. The key switch according to claim 1, wherein the at least one gripping feature comprises at least one side scoop and at least gripping feature on a surface of the side scoop.

11. The key switch according to claim 1, wherein two opposite portions of the side walls of the key base have a lower height.

12. The key switch according to claim 1, wherein the lowered portion of the side wall of the key base has a height sufficient to minimize engagement with the key base as the key cap is actuated.

13. The key switch according to claim 1, further comprising;
   a key dome arranged within the key cap and the key base, the key dome comprising a flexible operative to bias the key cap in an unactuated position.

14. The key switch according to claim 1, further comprising:
   guiding elements operative to guide the key cap as it is actuated.

15. The key switch according to claim 14, wherein the guiding elements comprise a post on one of the key base and the key cap and a post receiving collar on another of the key base and the key cap.

16. The key switch according to claim 14, wherein the guiding elements comprise at least one tab on at least one of the key base and the key cap and at least one tab receiving recess including a tab stop on another of the key base and the key cap.

17. The key switch according to claim 1, further comprising:
   an adhesive on a bottom surface of the key base, the adhesive operative to secure the key base on a surface.

18. The key switch according to claim 1, further comprising:

at least one label on at least one of the key base and the key cap, the at least one label indicating at least one of key identity and key function.

19. The key switch according to claim 18, wherein the at least one label comprises an electronic display.

20. The key switch according to claim 1, wherein the key cap and the key base are connectable without additional attached parts.

21. The key switch according to claim 1, further comprising:
    an RF circuit coil.

22. The key switch according to claim 21, wherein the RF circuit coil is arranged in the key base.

23. The key switch according to claim 1, further comprising:
    a printed circuit board comprising an RF circuit coil, a switch and an integrated circuit; and
    a switch closing element operative to close the switch.

24. The key switch according to claim 23, wherein the switch closing element is arranged on the key cap.

25. The key switch according to claim 23, further comprising;
    a key dome arranged within the key cap and the key base, the key dome comprising a flexible operative to bias the key cap in an unactuated position, wherein the switch closing element is arranged on the key dome.

26. An independently positionable key switch, comprising:
    a key base including a key cap receiving opening and at least one gripping feature operative to facilitate gripping of the key base;
    an actuatable key cap arranged in the key receiving opening of the key base, the key cap being actuatable between an unactuated position and an actuated position; and
    at least one label on at least one of the key base and the key cap, the at least one label indicating at least one of key identity and key function, wherein the at least one label is remotely modifiable.

27. An independently positionable key switch, comprising:
    a key base including a key cap receiving opening and at least one gripping feature operative to facilitate gripping of the key base;
    an actuatable key cap arranged in the key receiving opening of the key base, the key cap being actuatable between an unactuated position and an actuated position;
    an RF circuit coil; and
    a resonant switch arranged on the key cap and operative to affect the inductance or capacitance of the RF circuit coil as the key cap is actuated, wherein when the key cap is in an unactuated position it does not affect the inductance or capacitance of the RF circuit coil.

28. An independently positionable key switch, comprising:
    a key base including a key cap receiving opening and at least one gripping feature operative to facilitate gripping of the key base; and
    an actuatable key cap arranged in the key receiving opening of the key base, the key cap being actuatable between an unactuated position and an actuated position;
    wherein programming and testing of functioning of the key switch are carried out by assembling the key switch.

29. A method for assembling, programming and testing a key switch, the key switch comprising a key base including a key cap receiving opening, an actuatable key cap arranged in the key receiving opening, and an inductive resonant circuit, the method comprising:
    placing the key base in functional proximity to a reader;
    assembling the key cap and the key base; and
    actuating resonant circuit during the assembly step.

* * * * *